(No Model.) 2 Sheets—Sheet 1.
G. A. BARTH.
PISTON ROD GUIDE PACKING.
No. 398,931. Patented Mar. 5, 1889.
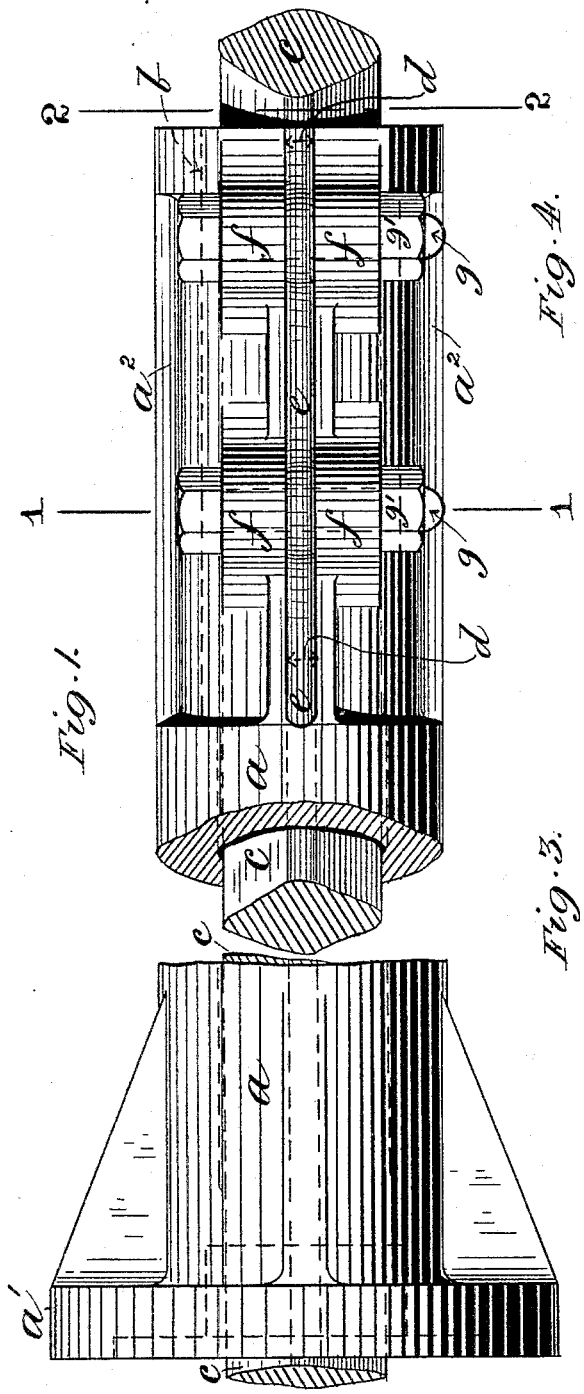
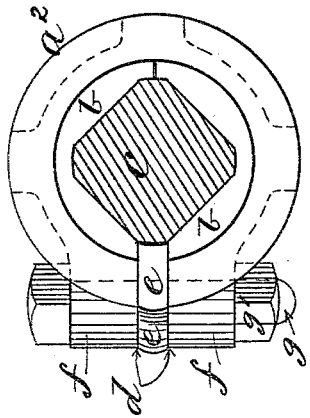
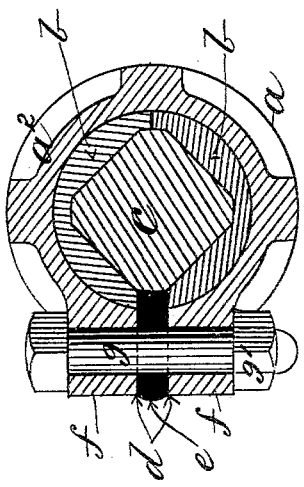
WITNESSES.
INVENTOR,
Gustav A. Barth by
Paine Bakewell
his attorney (No Model.) 2 Sheets—Sheet 2.

G. A. BARTH.
PISTON ROD GUIDE PACKING.

No. 398,931. Patented Mar. 5, 1889.

WITNESSES. INVENTOR.

UNITED STATES PATENT OFFICE.

GUSTAV A. BARTH, OF ST. LOUIS, MISSOURI, ASSIGNOR TO PIERRE CHOUTEAU, OF SAME PLACE.

PISTON-ROD-GUIDE PACKING.

SPECIFICATION forming part of Letters Patent No. 398,931, dated March 5, 1889.

Application filed December 27, 1888. Serial No. 294,756. (No model.)

*To all whom it may concern:*

Be it known that I, GUSTAV A. BARTH, a citizen of the United States, residing at the city of St. Louis, State of Missouri, have invented a certain new and useful Improved Holding Device for the Piston-Rod-Guide Packing of a Direct-Acting Steam or Pneumatic Engine, of which the following is a full, clear, and exact description.

My invention relates to improved means of securing the packing device designed for guiding the extension piston-rod of a direct-acting steam or pneumatic engine, and is preferably applicable to the invention described in an application for Letters Patent of the United States, Serial No. 283,220, filed by me August 20, 1888, allowed November 27, 1888, for improvements in direct-acting steam or pneumatic engines; and my invention has for its object to prevent the working loose of such packing from the jar of the tool, as now occurs when the packing is fixed by bolts, as in the said patent.

It consists in a slotway formed longitudinally through that portion of the cylindrical tube or casing containing the packing, a key or tongue being inserted within the slot and between the divided edges of the packing, combined with bolts, on tightening which the divided portions of the casing are closed upon the packing and tongue, and the packing thereby firmly held in place.

Figure 2:
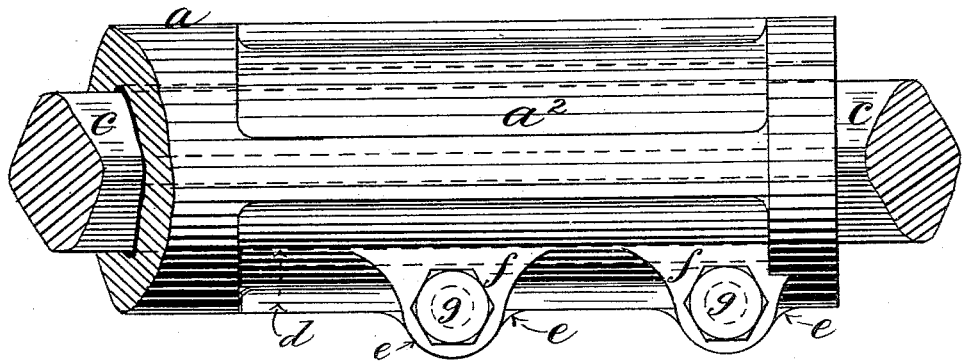
Figure 5:

On the accompanying drawings, Figure 1 represents a longitudinal elevation of the cylindrical tube or casing broken away, forming part of a direct-acting mining-engine (not shown) and containing the piston-rod-guide packing secured thereto according to my invention; Fig. 2, a similar view of the right-hand end portion thereof, taken at right angles to Fig. 1; Figs. 3 and 4, transverse sectional views on lines 1 1 and 2 2, respectively, in Fig. 1; and Fig. 5, a detached view of the key or tongue forming part of Figs. 1 to 4, like letters of reference denoting like parts in all the figures.

$a$ represents the cylindrical tube or casing, having at one end a flange, $a'$, by which it is secured to the cylinder end (not shown) of a direct-acting mining-engine in a similar manner to that described in my said application for Letters Patent.

Longitudinally into the outer end portion, $a^2$, of the tube or casing $a$, which is bored thereat for the purpose, are inserted two (or more) packing-strips, $b$, which are grooved or shaped, respectively, on their insides to the external shape of the extension piston-rod $c$, and are turned on their outsides, so that when placed together they will exactly fit within the bored end portion, $a^2$, of the casing $a$ and around the rod $c$, which is preferably square, with convex corners where it reciprocates through the packing $b$, so as to prevent the rotation of the rod $c$ during the operation of the machine.

Longitudinally through the wall of the outer end portion, $a^2$, of the casing $a$, containing the packing $b$, is formed a slot, $d$, within which is placed flatwise a key or tongue, $e$, having its inner edge projected within the casing $a$, so as to engage between adjacent edges of the packing-strips $b$.

Projecting from the wall of the casing $a$, adjacent to each edge of the slot $d$, are lugs $f$, through which and through the interposed key or tongue $e$, at right angles to the latter and to the longitudinal center of the casing $a$, are passed bolts $g$, arranged at a suitable distance apart and provided with nuts $g'$, whereby on tightening the bolts $g$ the lugs $f$ and divided wall $a^2$ of the casing $a$ are drawn together, and, closing upon the tongue $e$ and circumference of the packing-strips $b$, thereby clamps and firmly secures the packing $b$ from rotating or shifting endwise within the casing $a$ and securely holds the piston-rod in its proper position.

I claim as my invention—

1. In a piston-rod packing, the combination of a key or tongue inserted within a slotway formed through the wall of the casing containing the packing, with bolts passing through the said wall and tongue, and means for tightening said bolts, substantially as shown, and for the purpose described.

2. In a piston-rod packing, the combination of a key or tongue inserted within a slotway formed through the wall of the casing containing the packing and entering the circumference of the said packing, with bolts passing through the said wall and tongue, and means for tightening the bolts, substantially as shown, and for the purpose described.

3. The combination of packing-strips $b$, inserted within the cylindrical tube or casing $a$ $a^2$ and fitted around the piston-rod $c$ of a direct-acting engine, slotway $d$, formed longitudinally through the wall $a^2$ of the casing, key or tongue $e$, inserted flatwise within the slotway $d$ and engaging between adjacent edges of the packing-strips $b$, lugs $f$, projecting from the wall $a^2$ of the casing, with bolts $g$, passing through the lugs $f$ and interposed tongue $e$ and provided with nuts $e'$, substantially as shown, and for the purpose described.

In testimony whereof I affix my signature, in presence of two witnesses, this 22d day of December, 1888.

GUSTAV A. BARTH.

Witnesses:
S. L. SCHRADER,
PAUL BAKEWELL.